United States Patent
Hull et al.

(10) Patent No.: US 12,215,277 B2
(45) Date of Patent: *Feb. 4, 2025

(54) SEQUESTRATION OF CARBON DIOXIDE IN ORGANIC-RICH GEOLOGICAL FORMATIONS

(71) Applicant: Saudi Arabian Oil Company, Dhahran (SA)

(72) Inventors: Katherine Leigh Hull, Houston, TX (US); Hasmukh A. Patel, Houston, TX (US); Younane N. Abousleiman, Houston, TX (US); David Jacobi, Houston, TX (US); Poorna Srinivasan, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,885

(22) Filed: Nov. 14, 2023

(65) Prior Publication Data

US 2024/0084189 A1    Mar. 14, 2024

Related U.S. Application Data

(62) Division of application No. 17/550,302, filed on Dec. 14, 2021, now Pat. No. 11,851,610.

(51) Int. Cl.
*E21B 41/00* (2006.01)
*C09K 8/594* (2006.01)
*C09K 8/72* (2006.01)

(52) U.S. Cl.
CPC .............. *C09K 8/594* (2013.01); *C09K 8/72* (2013.01); *E21B 41/0064* (2013.01)

(58) Field of Classification Search
CPC ........ C09K 8/594; C09K 8/72; E21B 41/0064
See application file for complete search history.

(56) References Cited

U.S. PATENT DOCUMENTS

| | | | |
|---|---|---|---|
| 6,698,515 B2 | 3/2004 | Karanikas et al. | |
| 7,077,199 B2 | 7/2006 | Vinegar et al. | |
| 8,616,294 B2 * | 12/2013 | Zubrin | E21B 43/164 |
| | | | 166/402 |
| 8,899,331 B2 | 12/2014 | Burnham | |
| 10,351,758 B2 | 7/2019 | Hull et al. | |

(Continued)

OTHER PUBLICATIONS

Tong et al., "Committed Emissions from Existing Energy Infrastructure Jeopardize 1.5° C. Climate Target," Nature, 2019, 572(7769): 373-377, 17 pages.

(Continued)

*Primary Examiner* — Silvana C Runyan
(74) *Attorney, Agent, or Firm* — Fish & Richardson P.C.

(57) ABSTRACT

A method for subsurface sequestration of carbon dioxide includes placing into a subterranean zone an oxidizer having a redox potential of at least 0.5 volts. The subterranean zone has an average total organic content of at least three weight percent. Carbon dioxide is injected into the subterranean zone via one or a plurality of wells. A total volume of all fluids injected into the subterranean zone via the one or the plurality of wells includes, on average per well per month, at least sixty-five weight percent carbon dioxide and less than thirty weight percent water.

21 Claims, 6 Drawing Sheets

(56) References Cited

U.S. PATENT DOCUMENTS

| | | | |
|---|---|---|---|
| 10,871,061 B2 | 12/2020 | Hull et al. | |
| 11,078,406 B2 | 8/2021 | Hull et al. | |
| 11,542,815 B2 | 1/2023 | Hull et al. | |
| 11,946,344 B2 * | 4/2024 | Patel | E21B 41/0064 |
| 2002/0040177 A1 | 4/2002 | Maher | |
| 2003/0066647 A1 | 1/2003 | Abouodah | |
| 2003/0066644 A1 | 4/2003 | Karanikas | |
| 2008/0006410 A1 | 1/2008 | Looney et al. | |
| 2008/0088171 A1 | 4/2008 | Cheng | |
| 2010/0012331 A1 | 1/2010 | Lader | |
| 2011/0247814 A1 | 10/2011 | Karanikas | |
| 2017/0066959 A1 | 3/2017 | Hull et al. | |
| 2018/0328905 A1 * | 11/2018 | Jacobi | G01N 23/2251 |
| 2019/0211658 A1 | 7/2019 | Hull et al. | |
| 2021/0024808 A1 | 1/2021 | Schipper et al. | |
| 2021/0024814 A1 | 1/2021 | Schipper et al. | |
| 2021/0198558 A1 | 7/2021 | Hull et al. | |
| 2021/0198559 A1 | 7/2021 | Hull et al. | |
| 2021/0222055 A1 | 7/2021 | Schipper et al. | |
| 2022/0170365 A1 | 6/2022 | Hull et al. | |
| 2024/0093600 A1 | 3/2024 | Li et al. | |

OTHER PUBLICATIONS

Wang et al., "Molecular Simulation of CO2/CH4 Competitive Adsorption on Shale Kerogen for CO2 Sequestration and Enhanced Gas Recovery," J. Phys. Chem. C, 2018, 122, 30, 17009-17018, 29 pages.

U.S. Appl. No. 63/289,308, Hull et al., Negative Carbon City Grid for Capture and Sequestration of Carbon Dioxide in Subterranean Formations, filed Dec. 14, 2021, 59 pages.

* cited by examiner

SEQUESTRATION OF CARBON DIOXIDE IN ORGANIC-RICH GEOLOGICAL FORMATIONS

CROSS REFERENCE TO RELATED PATENT APPLICATIONS

This application is a divisional of and claims the benefit of priority to U.S. patent application Ser. No. 17/550,302 filed Dec. 14, 2021, issued as U.S. Pat. No. 11,851,610, the contents of which are incorporated by reference herein.

TECHNICAL FIELD

This document relates to methods and compositions for sequestering carbon dioxide in subterranean formations.

BACKGROUND

Anthropogenic carbon dioxide emissions continue to rise steadily. Potential global climate change associated with greenhouse gas (GHG) emissions can only be mitigated by reducing atmospheric carbon levels through emissions cuts or carbon capture utilization and storage (CCUS) technologies.

The aggressive goal to reduce atmospheric carbon dioxide accumulation will be very challenging to meet without significant technological developments for CCUS. Technologies for capturing and storing carbon dioxide, including those that can be retrofitted to existing structures, will be critical to achieving the global climate change mitigation goals.

There are several challenges associated with current CCUS technologies which include cost, scalability, longevity, and other factors. Many approaches have been considered and are currently under development. These include converting carbon dioxide to chemicals or fuels or with concrete mix for building materials. Unconventional uses of carbon dioxide include enhanced weathering techniques, forestry and land management.

Underground geological sequestration may be of particular interest for CCUS due to the potential large storage capacity of geological formations and the permanence of such sequestration. In geological sequestration, carbon dioxide is injected to suitable depths within the Earth wherein it can be permanently fixated. Much technological development of geological sequestration involves injecting carbon dioxide into saline reservoirs. However, organic-rich geological formations such as shales, depleted hydrocarbon-producing reservoirs, and coal seams may also comprise significant potential sequestration opportunities.

SUMMARY

This disclosure describes geological sequestration of carbon dioxide in organic-rich subterranean formations.

Certain aspects of the subject matter herein can be implemented as a method for subsurface sequestration of carbon dioxide. An oxidizer having a redox potential of at least 0.5 volts is placed into a subterranean zone having an average total organic content of at least three weight percent. Carbon dioxide is injected into the subterranean zone via one or a plurality of wells. A total volume of all fluids injected into the subterranean zone via the one or the plurality of wells includes, on average per well per month, at least sixty-five weight percent carbon dioxide and less than thirty weight percent water. At least a portion of the carbon dioxide is sequestered in the subterranean zone.

An aspect combinable with any of the other aspects can include the following features. The carbon dioxide can be injected into a portion of the subterranean zone into which the oxidizer is placed.

An aspect combinable with any of the other aspects can include the following features. The subterranean zone can be or can include a shale formation.

An aspect combinable with any of the other aspects can include the following features. The subterranean zone can be or can include a depleted hydrocarbon-producing reservoir formation.

An aspect combinable with any of the other aspects can include the following features. The subterranean zone can be or can include a coal seam.

An aspect combinable with any of the other aspects can include the following features. The coal seam can have an average total organic content of at least sixty percent.

An aspect combinable with any of the other aspects can include the following features. The oxidizer can be or can include an oxychlorine, an oxybromine, oxyiodine, chlorine, bromine, iodine, ozone, nitrous oxide, nitric oxide, nitrogen dioxide, a persulfate, a perborate, a percarbonate, or a peroxide.

An aspect combinable with any of the other aspects can include the following features. The placing of the oxidizer can be before the injection of the carbon dioxide.

An aspect combinable with any of the other aspects can include the following features. The placing of the oxidizer can be at least one day before the injection of the carbon dioxide.

An aspect combinable with any of the other aspects can include the following features. Placing the oxidizer can include mixing the oxidizer with the carbon dioxide prior to injection to form an oxidizer-carbon dioxide mixture and then injecting the oxidizer-carbon dioxide mixture into the subterranean zone.

An aspect combinable with any of the other aspects can include the following features. Placing the oxidizer can include injecting the oxidizer in the subterranean zone. Injecting of the oxidizer and injecting of the carbon dioxide includes alternating injections of aliquots of the oxidizer with injections of aliquots of the carbon dioxide.

An aspect combinable with any of the other aspects can include the following features. Placing the oxidizer in the subterranean zone can include generating the oxidizer in situ.

An aspect combinable with any of the other aspects can include the following features. Generating the oxidizer in situ can include providing precursors comprising a first precursor compound and a second precursor compound. The first precursor compound can be injected into the subterranean zone. The second precursor compound can be injected into the subterranean zone. The first and second precursor compounds can react to generate the oxidizer.

An aspect combinable with any of the other aspects can include the following features. The precursors can be or can include a chlorite and an oxidizing agent.

An aspect combinable with any of the other aspects can include the following features. The precursors can be or can include a chlorate and a reducing agent.

An aspect combinable with any of the other aspects can include the following features. Precursors including an acid can be included.

An aspect combinable with any of the other aspects can include the following features. The subterranean zone can be or can include a geological formation having an average formation temperature of less than 100 degrees centigrade. The oxidizer can be or can include at least one of chlorine, a hypochlorite, or chlorine dioxide.

An aspect combinable with any of the other aspects can include the following features. The subterranean zone can be or can include a geological formation having an average formation temperature of greater than 100 degrees centigrade. The oxidizer can be or can include at least one of bromine, an oxybromine, a chlorate, or a perchlorate.

An aspect combinable with any of the other aspects can include the following features. The placing of the oxidizer, the injecting of the carbon dioxide, and the sequestering of at least a portion of the carbon dioxide in the subterranean zone area can be some or all of a plurality of steps of a carbon dioxide sequestration operation having a sequestration rate of at least 250,000 metric tons per year per well.

An aspect combinable with any of the other aspects can include the following features. The concentration of the oxidizer relative to the amount of carbon dioxide injected into the subterranean zone can be less than 10 weight percent.

The details of one or more implementations of the disclosure are set forth in the accompanying drawings and the description that follows. Other features, objects, and advantages of the disclosure will be apparent from the description and drawings, and from the claims.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In accordance with some embodiments of the present disclosure, carbon dioxide ($CO_2$) is sequestered in a subterranean location by injecting carbon dioxide into one or more wells drilled into organic-rich formations such as depleted oil and gas-bearing formations, coals, and unconventional source rocks such as shale. Carbon dioxide is known to have a high affinity for organic matter such as in source shales, even more so than methane. Similar effects have been observed in all types of coal where carbon dioxide is used for enhanced coal bed methane (ECBM) recovery. Furthermore, depleted conventional reservoirs contain organic residues such as asphaltenes that could serve as surfaces for carbon dioxide adsorption and storage.

As described in further detail in the subsequent paragraphs below, in accordance with some embodiments of the present disclosure, the surface area, porosity, permeability, and/or chemical functionalization of the organic matter can be modified through oxidation processes so as to enhance the adsorption and storage of carbon dioxide. Specifically, in some embodiments, an oxidizer having a relatively high redox potential can be injected or otherwise placed in the subterranean zone (via injection or otherwise) prior to or simultaneously with injection of the carbon dioxide. In some embodiments, as described in further detail in the subsequent paragraphs below, the selected oxidizer has a redox potential of at least 0.5 volts.

Figure 1:
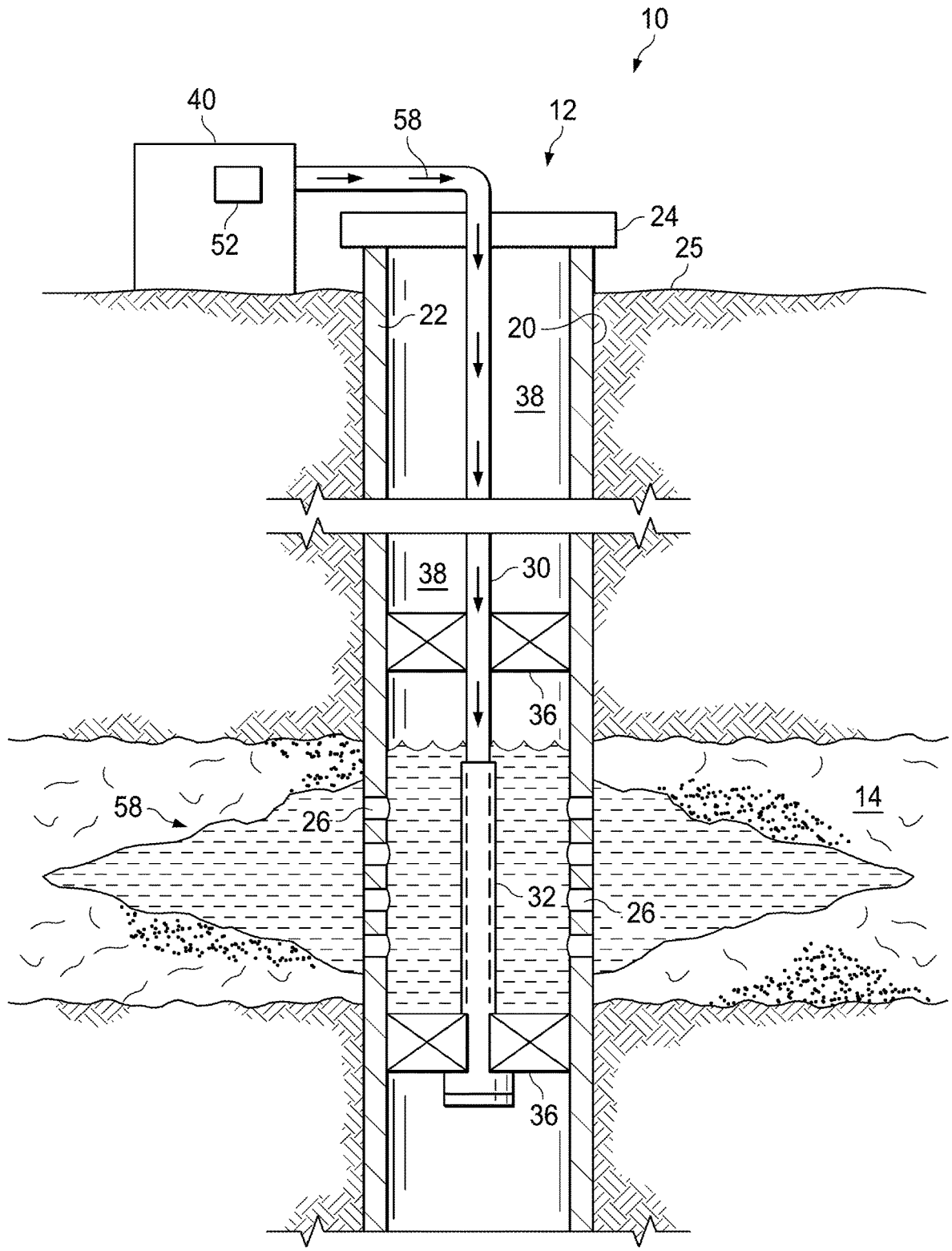
FIG. 1 shows an example of a well utilized for carbon dioxide sequestration operations in accordance with an embodiment of the present disclosure.

FIG. 1 illustrates an example of a carbon dioxide sequestration operation 10 including a well 12 drilled from a surface 25. The well 12 can be associated with a reservoir or formation 14, for example, an organic-rich geological formation. Examples of organic-rich geological formations include depleted hydrocarbon reservoirs, gas and oil shales, coal seams, heavy oil and tar sands, and gas-hydrate deposits. In some embodiments, formation 14 can have a total organic content of at least three weight percent (3 wt %). In some embodiments, formation 14 can have a greater a total organic content, for example 10, 20, 30, 40, or greater weight percent. In some embodiments, formation 14 can be a coal seam having a minimum total organic content equal to or greater than 60 percent. In some implementations, the well 12 can intersect a plurality of formations. In some embodiments, a sequestration operation can include a plurality of wells drilled into one or more formations.

The well 12 can include a well bore 20, casing 22 and well head 24. The well bore 20 can be a vertical or deviated bore. The casing 22 can be cemented or otherwise suitably secured in the well bore 12. Perforations 26 can be formed in the casing 22 at the level of the formation 14 to allow fluids to flow from the wellbore into the formation 14. Perforations 26 can be formed using shape charges, a perforating gun or otherwise.

For the carbon dioxide sequestration operation 10, a work string 30 can be disposed in the well bore 20. The work string 30 can be coiled tubing, sectioned pipe or other suitable tubing. An injection tool 32 can be coupled to an end of the work string 30. Packers 36 can seal an annulus 38 of the well bore 20 above and below the formation 14. Packers 36 can be mechanical, fluid inflatable or other suitable packers.

One or more pump systems 40 can be coupled to the work string 30 at the surface 25. The pump units 40 can pump carbon dioxide 58 and other substances such as oxidizers or oxidizer precursors down the work string 30 and into formation 14. The pump units 40 can be controlled by control module 52 and can include mobile vehicles or equipment such as skids or other suitable structures.

The injection state of carbon dioxide may be gaseous or supercritical. Supplemental chemicals can be added with treatment chemicals in carbon dioxide to control the rate of treatments and penetration of treatment chemicals into the formation. In accordance with some embodiments of the present disclosure, in a carbon dioxide subterranean sequestration operation, the total volume of injected fluid can comprise on average, per well per month, at least about sixty-five weight percent (65 wt %) carbon dioxide, less than about thirty weight percent (30 wt %) water, and less than about five weight percent (5 wt %) other components. Other embodiments may include greater or lesser amounts of these respective components. In some embodiments of the present disclosure, a carbon dioxide subterranean sequestration operation can sequester at least 250,000 metric tons per year per well. Other embodiments may include greater or lesser sequestration rate.

In accordance with some embodiments of the present disclosure, by injecting or otherwise placing oxidizer into the organic-rich subterranean zone prior to or simultaneously with injection of the carbon dioxide, the existing pore structure of the organic matter in the subterranean zone can be altered to generate excess surfaces to enhance the adsorption and storage of the carbon dioxide. The chemomechanical fluid design can (a) modify and enhance the structural porosity of any organic matter and increase its surface area augmenting it to multi-porosity and enhancing its hydraulic diffusivity facilitating the flow of carbon dioxide and its adsorption and (b) alter the rock/organic interfaces to increase the energy of carbon dioxide adsorption and storage gas volume. In unconventional rock formations, the rock can be hydraulically fractured in order to create sufficient permeability to transport and distribute the carbon dioxide throughout the formation. In coal seams, both producing coals as in Enhanced Coal Bed Methane (ECBM) and deep unmineable coal seams are potential storehouses for carbon dioxide.

In some embodiments of the present disclosure, conventional rock formations with residual organic tar, asphaltenes, or residues can also treated with oxidizer in order to enhance the porosity/permeability of the organic matter. In some embodiments, an enhanced oil recovery (EOR) process, where carbon dioxide with its high oil miscibility is injected into conventional reservoirs with depleted pressure, can be modified in order to improve the amount of carbon dioxide that is retained in the formation. In some embodiments, a water-alternating-gas (WAG) operation can be modified to include oxidizer pumped in the water phase: water-alternating-gas-oxidizer (WAGO). In accordance with some embodiments of the present disclosure, the oxidizer may be added directly to the carbon dioxide as it is being injected. The oxidizer may dissolve in the carbon dioxide or distribute homogeneously in the carbon dioxide as a liquid or gas. In some embodiments, the oxidizer can be pre-dissolved in a solvent that is miscible with carbon dioxide. In some embodiments, the oxidizer may be added in sequence with the carbon dioxide as it is being injected. The oxidizer may be in neat form if it is a liquid or gas or alternatively the solid, liquid or gas treatment chemical could be dissolved in a solvent (e.g., water) that can be but does not have to be miscible with carbon dioxide. The carbon dioxide and oxidizer may be alternated every day, week, or month. The injection state of carbon dioxide may be gaseous or supercritical and the oxidizer mixed in this state. Supplemental chemicals are added with treatment chemicals in carbon dioxide to control the rate of oxidizer treatments and penetration of treatment chemicals into the formation. In some embodiments, the concentration of the oxidizer relative to the amount of carbon dioxide could be 0.00001-10 wt %, 0.0001-5 wt %, 0.001-1 wt %. The concentration of predissolved treatment chemical relative to its solvent could be 0.01-70 wt %, 0.1-60 wt %, 1-50 wt %. The concentration of supplementary additives, e.g. surfactants or emulsifiers, controlled release organic, inorganic, or inorganic-organic moieties may range from 0.001-5 wt %, 0.01-2 wt %, 0.1-1 wt %. In some embodiments, only one oxidizer is used. In some embodiments, a mixture of different oxidizers can be used.

Figure 2:
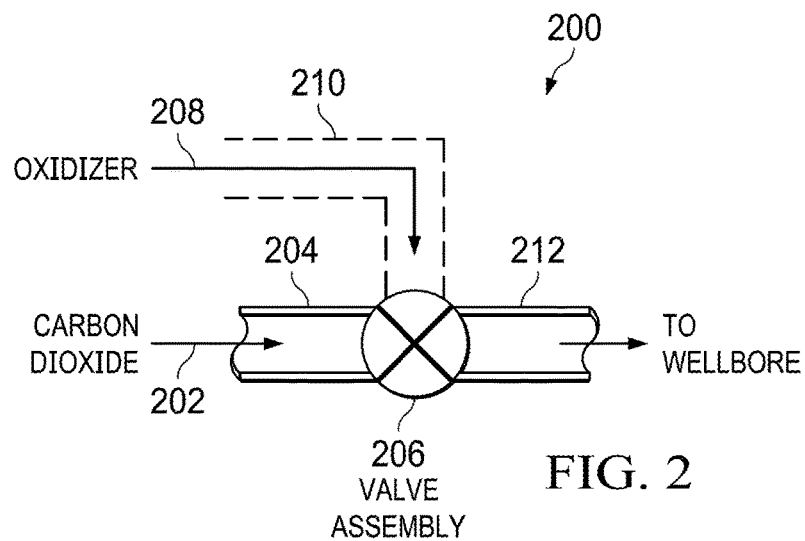
FIG. 2 is an example of a schematic of a valve system for injecting carbon dioxide and oxidizer in accordance with some embodiments of the present disclosure.

FIG. 2 is an example of a schematic of a valve system 200 for injecting carbon dioxide and oxidizer in accordance with some embodiments of the present disclosure. In some embodiments, valve system 200 can be configured to inject other substances in addition to or instead of carbon dioxide and oxidizer. Valve system 200 can in some embodiments be a component of, or connected to, pump system 40 of FIG. 1. Referring to FIG. 2, carbon dioxide 202 (or, in some embodiments, mixture of carbon dioxide and other substances) can be flowed through a first fluid flow pathway 204 (for example, an elongate tubular member) into through a valve assembly 206. An oxidizer 208 (or, in some embodiments, a mixture of oxidizer and other substances and/or an oxidizer precursor or precursors) can be flowed through a second fluid flow pathway 210 (for example, an elongated tubular member). Valve assembly 206 can in some embodiments be controlled or otherwise configured by a control module such as control module 52 of FIG. 1. Fluid from valve assembly 206 can flow through a third fluid flow pathway 212 (for example, an elongate tubular member) to be injected into the wellbore via for example, work string 30 of FIG. 1. Valve assembly 206 can in some embodiments be configured to mix carbon dioxide 202 and oxidizer 208 and/or other compositions prior to injection into the subterranean zone via, for example, work string 30 of FIG. 1. Alternatively or in addition, in some embodiments, valve assembly 206 can be configured to inject oxidizer 208 prior to or after injection of carbon dioxide 202 and/or other substances. Alternatively or in addition, in some embodiments, valve assembly 206 can be configured to alternate injections of aliquots of oxidizer 208 with injections of aliquots of carbon dioxide 202 (and/or with other substances).

Oxidizers with a relatively low redox potential (for example, oxygen gas) may provide a relatively low degree of oxidation of organic matter at typical formation temperatures, and may thus require that additional heat and/or a catalyst be added to the formation for effective sequestration enhancement. Therefore, in some embodiments of the present disclosure, oxidizers with a relatively high redox potential (equal to or greater than 0.5 volts at neutral conditions) are selected. Such oxidizers can in some embodiments adequately oxidize the organic matter at typical formation temperatures. In some embodiments, suitable oxidizers include, for example, an oxychlorine ($ClO_n$—) or an oxybromine ($BrO_n$—) or an oxyiodine ($IO_n$-) (where n=0, 1, 2, 3, or 4). In some embodiments, suitable oxidizers include a reactive gas such as ozone, nitrous oxide, nitric oxide, or nitrogen dioxide. In some embodiments, suitable oxidizers include a persulfate or a peroxide. In some embodiments, suitable oxidizers include a percarbonate, perborate, or other oxidizer that hydrolyzes to form peroxide in water. The oxidizer may also be in the form of a gas or liquid such as ClO₂ using, for example, a commercially available generator.

Table 1 shows standard redox potential of certain oxidizers which may be suitable for some embodiments of the present disclosure:

TABLE 1

| Redox Potential of Certain Oxidizers | |
|---|---|
| Reaction Under Neutral Conditions | Redox Potential (Volts) |
| $ClO_2^- + 2H_2O + 2e^- \rightarrow Cl^- + 4OH^-$ | +0.78 |
| $Cl_2 + 2e^- \rightarrow 2Cl^-$ | +1.36 |
| $Br_2 + 2e^- \rightarrow 2Br^-$ | +1.09 |
| $ClO^- + H_2O + 2e^- \rightarrow Cl^- + 2OH^-$ | +0.89 |
| $ClO_4^- + 4H_2O + 8e^- \rightarrow Cl^- + 8OH^-$ | +1.42 |
| $BrO_3^- + 3H_2O + 6e^- \rightarrow Br^- + 6OH^-$ | +0.58 |
| $S_2O_8^{2-} + 2e^- \rightarrow 2SO_4^{2-}$ | +2.01 |
| $O_3 + 2e^- + H_2O \rightarrow O_2 + 2OH^-$ | +1.24 |

Some suitable oxidants may be insoluble in carbon dioxide because they are salts. The oxidizing salts may in some embodiments be dissolved in water so they can be effectively delivered to the rock formation without prematurely precipitating out. Some oxidants such as $Cl_2$, $Br_2$, and $ClO_2$ can be delivered either in water or in carbon dioxide phase. An advantage to alternating water and carbon dioxide is related to the time scale for oxidation reaction to take place. As the water-oxidant comes in contact with the organic matter, the organic matter can react and crack open over a period of minutes to hours. Carbon dioxide can then be introduced and can penetrate into the fracture network, displacing hydrocarbons. Another water injection can then penetrate into the same network, but the oxidant can react deeper in the formation and extend the fracture network.

In some embodiments, the temperature of the subterranean zone can be taken into account in determining which oxidizer is most suitable. For example, for a geological formation having an average formation temperature of less than 100 degrees centigrade, experimental results indicate that chlorine, a hypochlorite, or chlorine dioxide would be especially effective at enhancing the sequestration of carbon dioxide. For a geological formation having an average formation temperature of greater than 100 degrees centigrade, experimental results indicate that bromine, oxybromine, chlorate, or perchlorate would be especially effective at enhancing the sequestration of carbon dioxide.

Alternatively, or in addition to, injecting the oxidizer from the surface, the oxidizer can be generated in situ. First, a first precursor compound is injected into the carbon dioxide, which is pumped into the wellbore. Next, a spacer amount of carbon dioxide is pumped into the wellbore. Then, a second precursor compound is injected into the carbon dioxide, which is pumped into the wellbore. The spacer amount of carbon dioxide ensures that the precursors do not prematurely react to form the oxidizer before reaching a pre-determined depth within the wellbore.

The oxidizing gasses generated in situ can be prepared by one or more of several techniques. For example, the chlorite can be combined with an acid, for example, hydrochloric acid (HCl) or hydrosulfuric acid ($H_2SO_4$). In some implementations, the in situ preparation of chlorine dioxide can occur using a chlorite and an oxidizing agent as the precursors. In some implementations, the oxidizing agent can be chlorine gas ($Cl_2$) or hypochlorite ($ClO^-$). The oxidizing gas can also be generated in situ using a chlorite, an oxidizing agent, and an acid. Suitable acids include citric acid, oxalic acid, HCl, or $H_2SO_4$.

Alternatively, the oxidizing gas can be generated using a chlorate and a reducing agent as the precursors. Suitable reducing agents include methanol, hydrogen peroxide, HCl, or sulfur dioxide. In addition, the oxidizing gas can also be generated in situ using a chlorate, a reducing agent, and an acid. Suitable acids include HCl and $H_2SO_4$.

Example 1: Generation of chlorine dioxide by oxidation of sodium chlorite, for example the reaction of sodium chlorite ($NaClO_2$) and hydrochloric acid (HCl):

$$5NaClO_2 + 4HCl \rightarrow 5NaCl + 4ClO_2 + 2H_2O \qquad \text{eq. 1}$$

Example 2: Generation of chlorine dioxide by oxidation of sodium chlorite, using hydrochloric acid and sodium hypochlorite:

$$2NaClO_2 + 2HCl + NaOCl \rightarrow 2ClO_2 + 3NaCl + H_2O \qquad \text{eq. 2}$$

Example 3: Generation of chlorine dioxide by oxidation of sodium chlorite with chlorine gas:

$$2NaClO_2 + Cl_2 \rightarrow 2ClO_2 + 2NaCl \qquad \text{eq. 3}$$

Example 4: Generation of chlorine dioxide by reduction of sodium chlorate, for example, the reduction of sodium chlorate with oxalic acid:

$$2KClO_3 + 2H_2C_2O_4 \rightarrow 2ClO_2 + 2CO_2 + 2H_2O \qquad \text{eq. 4}$$

Example 5: Generation of chlorine dioxide by reduction of sodium chlorate with hydrochloric acid:

$$2ClO_3^- + 2Cl^- + 4H^+ \rightarrow 2ClO_2 + Cl_2 + 2H_2O \qquad \text{eq.}$$

In some embodiments, carbon dioxide-philic chemicals, for example, organic or inorganic materials functionalized with amines, hydroxyls, Nitrogen and/or oxygen-containing heterocycles, can be used to increase the carbon dioxide storage capacity of treated and/or oxidized organic matter In order to demonstrate the improved carbon dioxide sorption as a result of aqueous oxidant treatment, a series of oxidation experiments were performed on shale and bituminous coal then analyzed by thermogravimetric analysis (TGA). In this approach, materials are exposed to carbon dioxide flow, and the sensitive balance of the TGA detects any changes in mass associated with carbon dioxide sorption to the surface of the materials.

Figure 3:
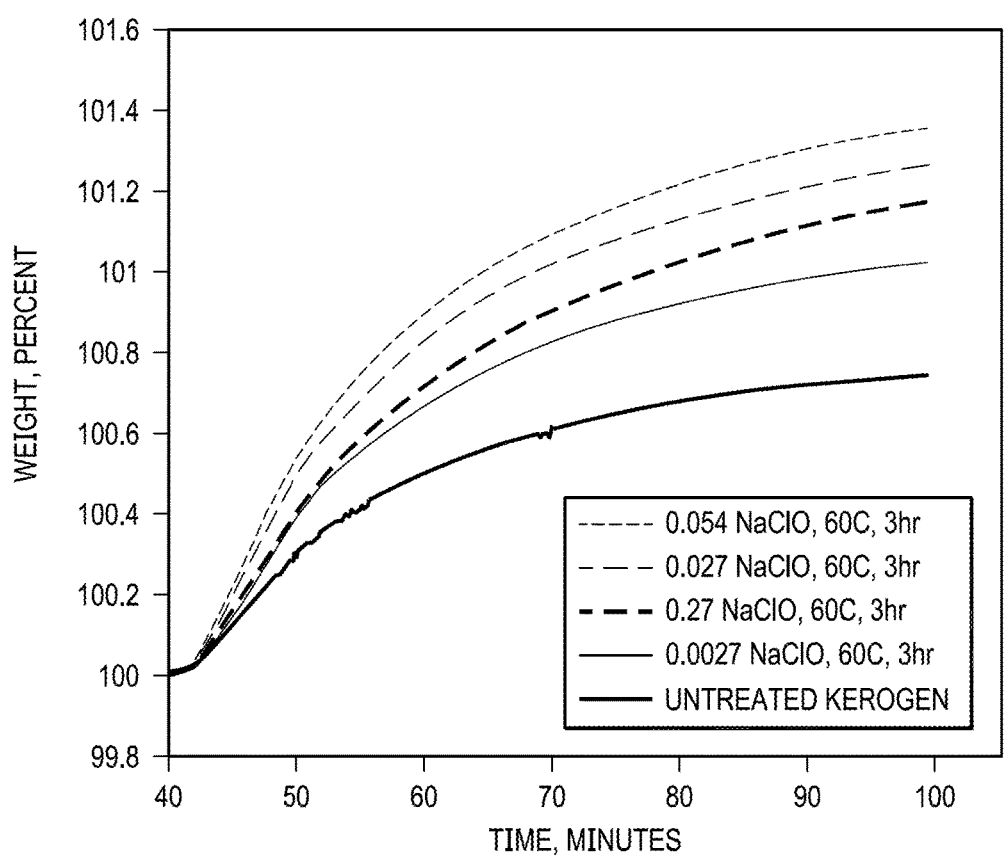
FIG. 3 is a thermogravimetric analysis of kerogen treated with sodium hypochlorite for three hours at sixty degrees Celsius in accordance with an embodiment of the present disclosure.

FIG. 3 is a thermogravimetric analysis of kerogen treated with sodium hypochlorite for three hours at sixty degrees Celsius in accordance with an embodiment of the present disclosure. More specifically, a 0.060 g sample of late maturity kerogen isolated from unconventional source shale rock was combined with 15 mL of various concentrations of NaOCl in a pressure tube. The kerogen and oxidizer were heated for 3 hours at 60° C. After cooling, the kerogen residue was filtered and dried and used for TGA. TGA measurements were performed on TA Instruments SDT Q600. The samples were placed in a tared alumina ceramic crucible and were heated at 80° C. in $N_2$ gas flow (50 mL min−1) for 20 minutes. The temperature was then reduced to 40° C. under continuous N2 flow. The atmosphere was then changed to pure carbon dioxide which was flowed at 50 mL min−1 at ambient pressure. The balance mass was monitored as a function of time in order to determine the carbon dioxide sorption capacity. For each experiment, approximately 10-15 mg of solid material was placed in the crucible of the thermobalance.

Figure 4:
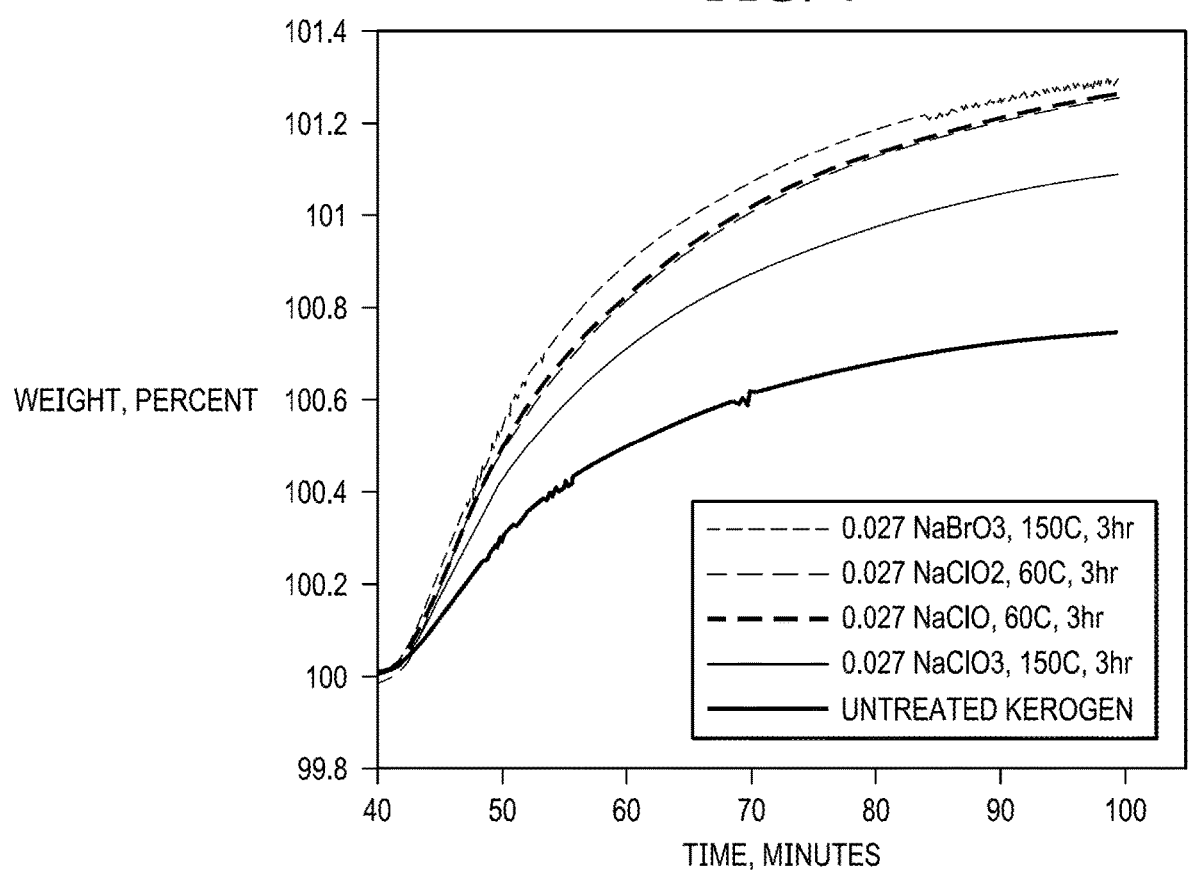
FIG. 4 is a thermogravimetric analysis of kerogen treated with various oxidants for three hours at sixty to one-hundred fifty degrees Celsius in accordance with an embodiment of the present disclosure.

FIG. 4 is a thermogravimetric analysis of kerogen treated with various oxidants for three hours at sixty to one-hundred fifty degrees Celsius in accordance with an embodiment of the present disclosure. More specifically, a 0.10 g sample of late maturity kerogen isolated from unconventional source shale rock was combined with 15 mL of 0.027M NaClO, $NaClO_2$, $NaClO_3$, or $NaBrO_3$ in a pressure tube. The kerogen and oxidizer were heated for 3 hours at 60-150° C. After cooling, the kerogen residue was filtered and dried and used for thermogravimetric analysis (TGA). TGA measurements were performed on TA Instruments SDT Q600. The samples were placed in a tared alumina ceramic crucible and were heated at 80° C. in $N_2$ gas flow (50 mL min-1) for 20 minutes. The temperature was then reduced to 40° C. under continuous N2 flow. The atmosphere was then changed to pure carbon dioxide which was flowed at 50 mL min-1 at ambient pressure. The balance mass was monitored as a function of time in order to determine the carbon dioxide sorption capacity. For each experiment, approximately 10-15 mg of solid material was placed in the crucible of the thermobalance.

Figure 5:
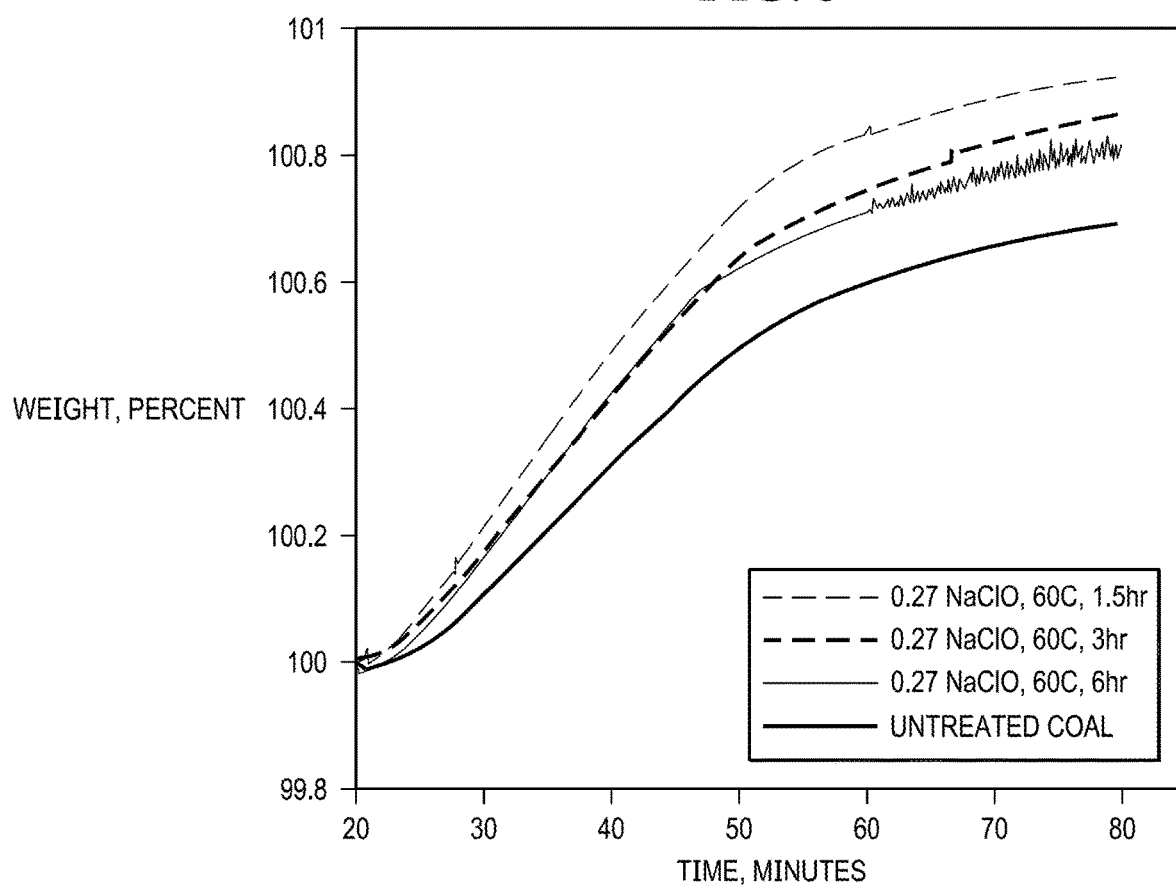
FIG. 5 is a thermogravimetric analysis of coal treated with sodium hypochlorite for approximately one and one-half hours at sixty degrees Celsius in accordance with an embodiment of the present disclosure.

FIG. 5 is a thermogravimetric analysis of coal treated with sodium hypochlorite for approximately one and one-half hours at sixty degrees Celsius in accordance with an embodiment of the present disclosure. A 0.10 g sample of bituminous coal was combined with 25 mL of 0.27 M NaOCl in a pressure tube. The coal and oxidizer were heated for 1.5, 3, and 6 hours at 60° C. After cooling, the residue was filtered and dried and used for TGA. TGA measurements were performed on TA Instruments SDT Q600. The sample was placed in a tared alumina ceramic crucible and were heated at 80° C. in $N_2$ gas flow (50 mL min-1) for 20 minutes. The temperature was then reduced to 40° C. under continuous N2 flow. The atmosphere was then changed to pure carbon dioxide which was flowed at 50 mL min-1 at ambient pressure. The balance mass was monitored as a function of time in order to determine the carbon dioxide sorption capacity. For each experiment, approximately 10-15 mg of solid material was placed in the crucible of the thermobalance.

Figure 6:
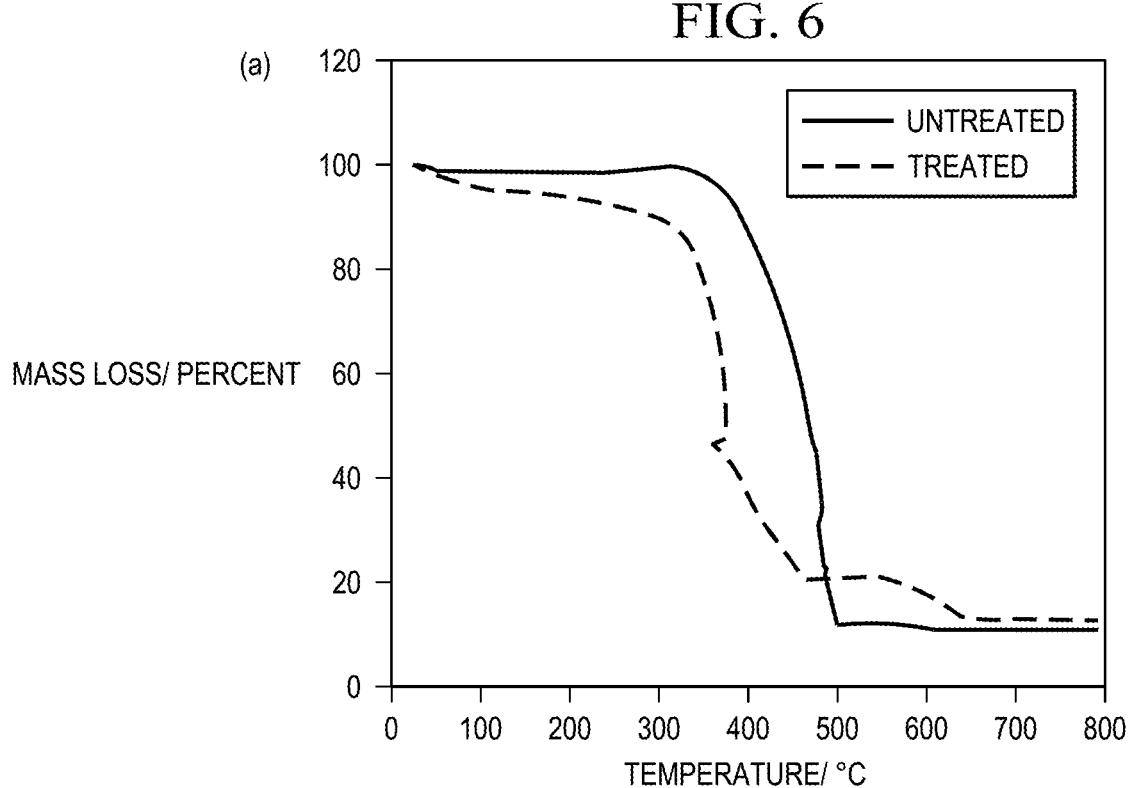
FIG. 6 is a graph of mass loss as a function of temperature for treated and untreated shale kerogen in accordance with an embodiment of the present disclosure.
Figure 7:
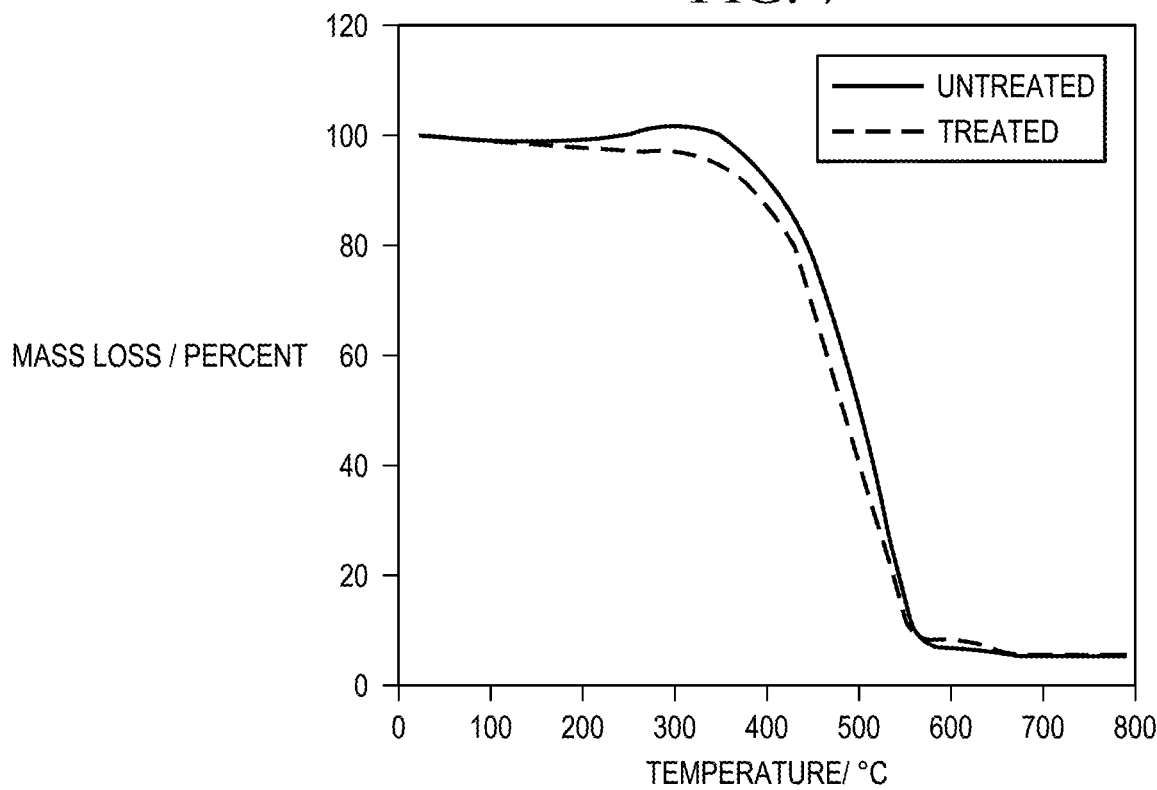
FIG. 7 is a graph of mass loss as a function of temperature for treated and untreated bituminous coal in accordance with an embodiment of the present disclosure.

FIG. 6 is a graph of mass loss as a function of temperature for treated and untreated shale kerogen in accordance with an embodiment of the present disclosure. FIG. 7 is a graph of mass loss as a function of temperature for treated and untreated bituminous coal in accordance with an embodiment of the present disclosure. More specifically, the plots show the results of carbon dioxide sorption to untreated kerogen (FIG. 6) and bituminous coal (FIG. 7) and to the corresponding treated samples. The adsorption of carbon dioxide is notably higher in the oxidized samples than in the control sample, indicating that the surface area is enhanced and/or the surface characteristics of the oxidized organic matter have a higher affinity for carbon dioxide.

The chemical treatment (oxidation) of organic matter result into cleavage of the long-chain hydrocarbons into shorter chain hydrocarbons. The mechanism of cleaving upon oxidative degradation generates higher surfaces for carbon dioxide adsorption in the treated organic matter. The decomposition temperature for untreated shale kerogen and treated shale kerogen was observed to be 320° C. and 230° C., respectively (FIG. 6). The reduction in the decomposition temperature clearly suggests the formation of short chain organic adducts after the oxidative treatment. Likewise, untreated bituminous coal undergoes decomposition at 350° C. and treated bituminous coal start to decompose at 290° C. (FIG. 7).

The TGA studies on treated and untreated organic matter demonstrate the alteration in architectures of the organic matter by decomposition of long-chain hydrocarbons. The oxidative treatment of organic matter allows the development of excess interface where carbon dioxide could react and provide higher carbon dioxide storage capacity.

Figure 8:
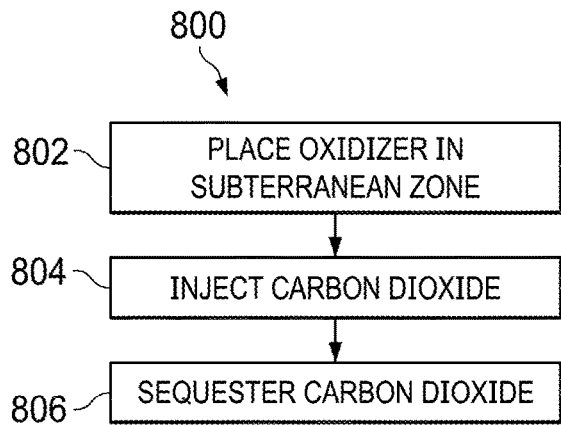
FIG. 8 is a flow chart of an example of a method for sequestering carbon dioxide in a subterranean zone in accordance with an embodiment of the present disclosure.

FIG. 8 is a flowchart of an example of a method 800 for subsurface sequestration of carbon dioxide. The method begins at step 802 wherein an oxidizer having a redox potential of at least 0.5 volts is placed within a subterranean zone having an average total organic content of at least three weight percent. Such placement can be, for example, by injecting the oxidizer via one or more wells drilled into the subterranean zone. Proceeding to step 804, carbon dioxide is injected into the subterranean zone via a well or wells, which, in some embodiments, can be the same wells that are used for the oxidizer injection or, in some embodiments, can be a different well or wells. In some embodiments, steps 802 and 804 can occur in sequence or can be alternately repeated. In some embodiments, steps 802 and 804 can be simultaneous by, for example, mixing the oxidizer and carbon dioxide prior to injection. In some embodiments, steps 802 and 804 can be steps of a sequestration operation in which a total volume of all fluids injected into the subterranean zone comprises, on average per well per month, at least sixty-five weight percent carbon dioxide and less than thirty weight percent water. Proceeding to step 806, at least a portion of the carbon dioxide injected during step 804 is sequestered in the subterranean zone, and such sequestration is enhanced by the effects of the oxidizer on the organic matter of the subterranean zone.

Figure 9:
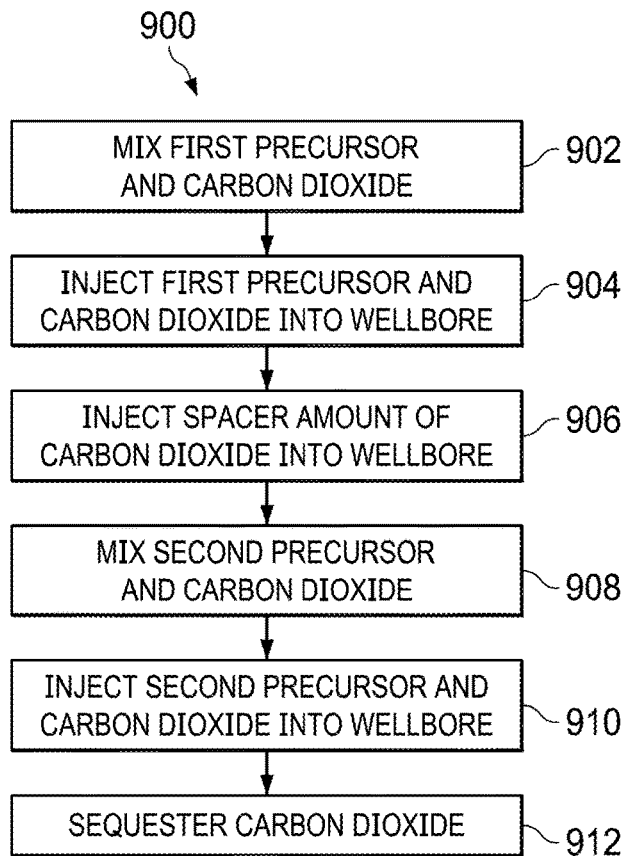
FIG. 9 is a flow chart of an example of a method for sequestering carbon dioxide in a subterranean zone in accordance with an embodiment of the present disclosure.

FIG. 9 is a flowchart of an example of a method 900 for subsurface sequestration of carbon dioxide. Method 900 includes the use of precursors to generate the oxidizer in situ. At 902, a first precursor is mixed with carbon dioxide. At 904, the first precursor and carbon dioxide are pumped into the wellbore. At 906, a spacer amount of carbon dioxide is pumped into the wellbore. At 908, a second precursor is mixed with carbon dioxide. At 910, the second precursor and carbon dioxide are pumped into the wellbore. As described previously, the precursors react to generate an oxidizer in situ. Proceeding to step 912, at least a portion of the carbon dioxide injected during preceding steps is sequestered in the subterranean zone, and such sequestration is enhanced by the effects of the oxidizer on the organic matter of the subterranean zone.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

As used in this disclosure, the term "subterranean material" or "subterranean zone" refers to any material under the surface of the earth, including under the surface of the bottom of the ocean. For example, a subterranean zone or material can be any section of a wellbore and any section of a geological formation or region in fluid contact with the wellbore.

A number of implementations of the disclosure have been described. Nevertheless, it will be understood that various modifications may be made without departing from the spirit and scope of the disclosure.

What is claimed is:

1. A method for subsurface sequestration of carbon dioxide, the method comprising:
    forming an oxidizer-carbon dioxide mixture by mixing, with carbon dioxide, an oxidizer having a redox potential of at least 0.5 volts;
    injecting the oxidizer-carbon dioxide mixture into a subterranean zone having an average total organic content of at least three weight percent via one or a plurality of wells, wherein a total volume of the mixture injected into the subterranean zone via the one or the plurality of wells comprises, on average per well per month, at least sixty-five weight percent carbon dioxide and less than thirty weight percent water; and
    sequestering at least a portion of the carbon dioxide in the subterranean zone.

2. The method of claim 1, wherein the subterranean zone comprises a shale formation.

3. The method of claim 1, wherein the subterranean zone comprises a depleted hydrocarbon-producing reservoir formation.

4. The method of claim 1, wherein the subterranean zone comprises a coal seam.

5. The method of claim 4, wherein the coal seam has an average total organic content of at least sixty percent.

6. The method of claim 1, wherein the oxidizer comprises at least one of:
    an oxychlorine;
    an oxybromine;
    oxyiodine;
    chlorine;
    bromine;
    iodine;
    ozone;
    nitrous oxide;
    nitric oxide;
    nitrogen dioxide;
    a persulfate;
    a perborate;
    a percarbonate; or
    a peroxide.

7. The method of claim 1, wherein the subterranean zone comprises a geological formation having an average formation temperature of less than 100 degrees centigrade, and wherein the oxidizer comprises at least one of chlorine, a hypochlorite, or chlorine dioxide.

8. The method of claim 1, wherein the subterranean zone comprises a geological formation having an average formation temperature of greater than 100 degrees centigrade, and wherein the oxidizer comprises at least one of bromine, an oxybromine, a chlorate, or a perchlorate.

9. The method of claim 1, wherein injecting the oxidizer-carbon dioxide mixture into the subterranean zone is a step of a carbon dioxide sequestration operation having a sequestration rate of at least 250,000 metric tons per year per well.

10. The method of claim 1, wherein a concentration of the oxidizer relative to the amount of carbon dioxide in the mixture is less than 10 weight percent.

11. A method for subsurface sequestration of carbon dioxide, the method comprising:
    forming, in situ in a subterranean zone, an oxidizer having a redox potential of at least 0.5 volts by injecting a first precursor compound into the subterranean zone and then injecting a second precursor compound into the subterranean zone, the first precursor compound and the second precursor compound reactive to form the oxidizer, the subterranean zone having an average total organic content of at least three weight percent;
    injecting carbon dioxide into the subterranean zone via one or a plurality of wells, wherein a total volume of all fluids injected into the subterranean zone via the one or the plurality of wells comprises, on average per well per month, at least sixty-five weight percent carbon dioxide and less than thirty weight percent water; and
    sequestering at least a portion of the carbon dioxide in the subterranean zone.

12. The method of claim 11, wherein the first precursor comprises a chlorite and the second precursor comprises an oxidizing agent.

13. The method of claim 11, wherein the first precursor comprises a chlorate and the second precursor comprises a reducing agent.

14. The method of claim 11, wherein the first precursor comprises an acid and the second precursor comprises and acid.

15. The method of claim 11, wherein the subterranean zone comprises a shale formation.

16. The method of claim 11, wherein the subterranean zone comprises a depleted hydrocarbon-producing reservoir formation.

17. The method of claim 11, wherein the subterranean zone comprises a coal seam.

18. The method of claim 17, wherein the coal seam has an average total organic content of at least sixty percent.

19. The method of claim 11, wherein the subterranean zone comprises a geological formation having an average formation temperature of less than 100 degrees centigrade.

20. The method of claim 11, wherein the subterranean zone comprises a geological formation having an average formation temperature of greater than 100 degrees centigrade.

21. The method of claim 11, wherein a sequestration rate of the sequestering is at least 250,000 metric tons per year per well.

* * * * *

UNITED STATES PATENT AND TRADEMARK OFFICE
CERTIFICATE OF CORRECTION

| | | |
|---|---|---|
| PATENT NO. | : 12,215,277 B2 | Page 1 of 1 |
| APPLICATION NO. | : 18/508885 | |
| DATED | : February 4, 2025 | |
| INVENTOR(S) | : Katherine Leigh Hull et al. | |

It is certified that error appears in the above-identified patent and that said Letters Patent is hereby corrected as shown below:

In the Claims

In Column 12, Line 32, Claim 14, please replace second occurrence of "and" with -- an --

Signed and Sealed this
Twenty-fifth Day of March, 2025

Coke Morgan Stewart
*Acting Director of the United States Patent and Trademark Office*